US009962865B2

(12) United States Patent
Ackland et al.

(10) Patent No.: US 9,962,865 B2
(45) Date of Patent: May 8, 2018

(54) MEMBRANE POTTING METHODS

(71) Applicant: Siemens Water Technologies LLC, Alpharetta, GA (US)

(72) Inventors: Peter Breffni Ackland, Seven Hills (AU); Michael Collignon, Annagrove (AU); Ying Hao Teo, Carlingford (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 733 days.

(21) Appl. No.: 14/033,968

(22) Filed: Sep. 23, 2013

(65) Prior Publication Data
US 2014/0084511 A1   Mar. 27, 2014

(30) Foreign Application Priority Data

Sep. 26, 2012 (AU) ................................ 2012904203
Sep. 23, 2013 (AU) ................................ 2013231145

(51) Int. Cl.
*B29C 39/10* (2006.01)
*B01D 63/02* (2006.01)

(52) U.S. Cl.
CPC ............ *B29C 39/10* (2013.01); *B01D 63/022* (2013.01); *B01D 63/02* (2013.01); *B01D 2313/21* (2013.01)

(58) Field of Classification Search
CPC .... B01D 63/02; B01D 63/021; B01D 63/022; B01D 63/023; B01D 2313/04;
(Continued)

(56) References Cited

U.S. PATENT DOCUMENTS 256,008 A   4/1882 Leak
285,321 A   9/1883 Tams
(Continued)

FOREIGN PATENT DOCUMENTS

AU   34400/84 A   4/1985
AU   55847/86 A   9/1986
(Continued)

OTHER PUBLICATIONS

Almulla et al., "Developments in high recovery brackish water desalination plants as part of the solution to water quantity problems," Desalination, 153 (2002), pp. 237-243.
(Continued)

*Primary Examiner* — Pranav N Patel

(57) ABSTRACT

Apparatus and methods are disclosed which reduce stress formation in potting heads for porous hollow filtration membranes. In one example, there is disclosed a potting sleeve for forming a potting head which includes a first fixed portion and a second portion which is movable relative to the first fixed portion to reduce a peripheral extent thereof. In another example, a method of mounting a porous hollow membrane in a membrane filtration apparatus includes positioning a portion of porous hollow membranes within a mold and introducing a curable potting material into the mold so as to immerse the portion of the porous hollow membranes and at least part of one or more deformable members in the potting material. The method further includes at least partially curing the potting material to form a potting head and removing the potting head and the one or more deformable members from the mold.

4 Claims, 7 Drawing Sheets

(58) Field of Classification Search
CPC ............ B01D 2313/06; B01D 2313/13; B01D 2313/14; B01D 2313/21; B01D 2313/23; B29C 39/10; B29C 70/70; B29C 70/865; B29C 2045/14122; B29C 2045/14131; B29C 45/14385; B29C 65/4815

See application file for complete search history.

(56) References Cited

U.S. PATENT DOCUMENTS

| | | |
|---|---|---|
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Jacob Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,955,998 A | 5/1976 | Clampitt et al. |
| 3,962,095 A | 6/1976 | Luppi |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,686,039 A * | 8/1987 | Otstot .................. B01D 53/22 210/321.61 |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |

(56) References Cited

U.S. PATENT DOCUMENTS

| | | |
|---|---|---|
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,415,490 A * | 5/1995 | Flory .................... F16G 11/05 24/122.6 |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |

(56) References Cited

U.S. PATENT DOCUMENTS

| | | |
|---|---|---|
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |

(56) References Cited

U.S. PATENT DOCUMENTS

| | | |
|---|---|---|
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,540,957 B1 | 6/2009 | Kurth et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178136 A1* | 9/2004 | Taniguchi .............. B01D 63/02 210/321.79 |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0092674 A1 | 5/2005 | Mahendran et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |

(56) References Cited

U.S. PATENT DOCUMENTS

| | | |
|---|---|---|
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1* | 5/2007 | Berends ............... B01D 63/04 210/321.6 |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0210623 A1 | 9/2008 | McMahon et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0218274 A1* | 9/2009 | Sakashita ............... B01D 63/02 210/321.6 |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114551 A1* | 5/2011 | Suzuki .................. B01D 61/18 210/321.89 |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |

(56) References Cited

FOREIGN PATENT DOCUMENTS

| | | |
|---|---|---|
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |

(56) References Cited

FOREIGN PATENT DOCUMENTS

| | | |
|---|---|---|
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 3302992 B2 | 7/2002 |
| JP | 2002525197 T | 8/2002 |
| JP | 2002527229 A | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 347343 | 12/1998 |
| WO | 1985001449 A1 | 4/1985 |
| WO | 1986005116 A1 | 9/1986 |
| WO | 1986005705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 200030742 A1 | 6/2000 |
| WO | 200100307 A2 | 1/2001 |
| WO | 200105715 A1 | 1/2001 |
| WO | 0108790 A1 | 2/2001 |
| WO | 200119414 A1 | 3/2001 |
| WO | 200132299 A1 | 5/2001 |
| WO | 200136075 A1 | 5/2001 |
| WO | 0143856 A1 | 6/2001 |

(56) References Cited

FOREIGN PATENT DOCUMENTS

| | | |
|---|---|---|
| WO | 200145829 A1 | 6/2001 |
| WO | 0230550 A1 | 4/2002 |
| WO | 200226363 A2 | 4/2002 |
| WO | 2002040140 A1 | 5/2002 |
| WO | 2002047800 A1 | 6/2002 |
| WO | 2003000389 A2 | 1/2003 |
| WO | 03013706 A1 | 2/2003 |
| WO | 2003013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

Anonymous, "Nonwoven Constructions of Dyneon™ THV and Dyneon™ HTE Fluorothermoplastics", Research Disclosure Journal, Apr. 1999, RD 420013, 2 pages.

Cote et al. "A New Immersed Membrane for Pretreatment to Reverse Osmosis," Desalination, 139 (2001), pp. 229-236.

Cote et al., "Immersed Membranes Activated Sludge Process Applied to the Treatment of Municipal Wastewater," Wat. Sci. Tech. 38(4-5) (1998), pp. 437-442.

Coulson et al., "Coulson and Richardson's Chemical Engineering," 1999, vol. 1, pp. 358-364.

Crawford et al., American Water Works Association Membrane Technology Conference, "Procurement of Membrane Equipment: Differences Between Water Treatment and Membrane Bioreactor (MBR) Applications," (2003).

Cui et al., "Airlift crossflow membrane filtration—a feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999, Chapters 2 and 5.

Judd, "The MBR Book: Principles and Applications of Membrane Bioreactors in Water and Wastewater Treatment," (2006), pp. 174-178.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system," Water Research, 37(5) Mar. 2003, pp. 1192-1197, Elsevier, Amsterdam, NL.

Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Miller et al., "Side Stream Air Lift MBR Development and Successful Application of a New Generation of MBR," Pollution Solutions Brochure, NORIT, The Netherlands, Apr. 2008.

Nakayama, "Introduction to Fluid Mechanics," Butterworth-Heinemann, Oxford, UK, 2000.

Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.

Rosenberger et al., "Filterability of activated sludge in membrane bioreactors," Desalination, 151 (2002), pp. 195-200.

Schematic of 4" Geyser Pump, Geyser Pump Tech. Co., Nov. 13, 2005.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmmrw.interscience.wiley.com/eow/.

White et al., "Optimisation of intermittently operated microfiltration processes," The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989), pp. 43-54.

Yoon: "Important operational parameters of membrane bioreactor-sludge disintegration (MBR-SD) system for zero excess sludge production" Water Research, 37 (2003), pp. 1921-1931, Elsevier, Amsterdam, NL.

(56) References Cited

OTHER PUBLICATIONS

Zenon, "Proposal for ZeeWeed® Membrane Filtration Equipment System for the City of Westminster, Colorado, Proposal No. 479-99," Mar. 2000, entire publication.

* cited by examiner

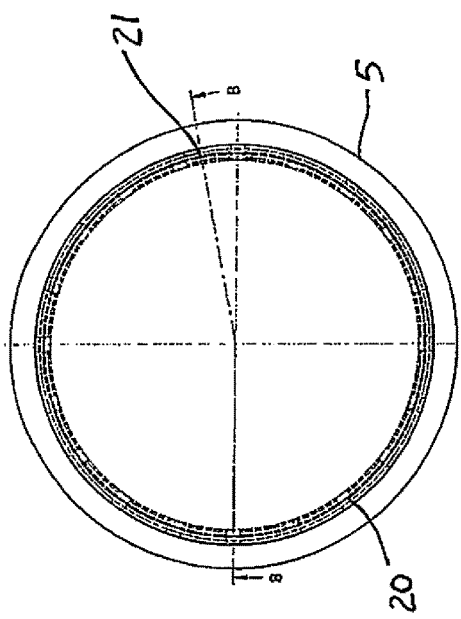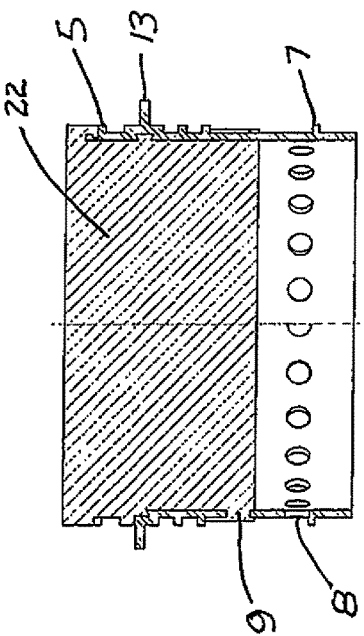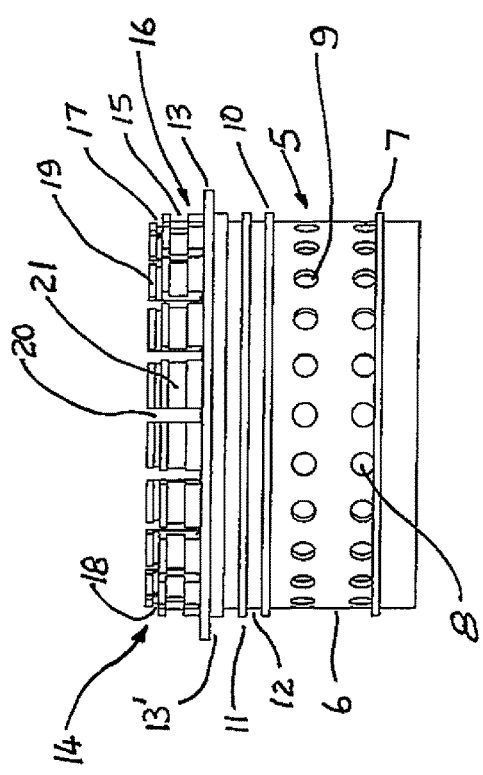

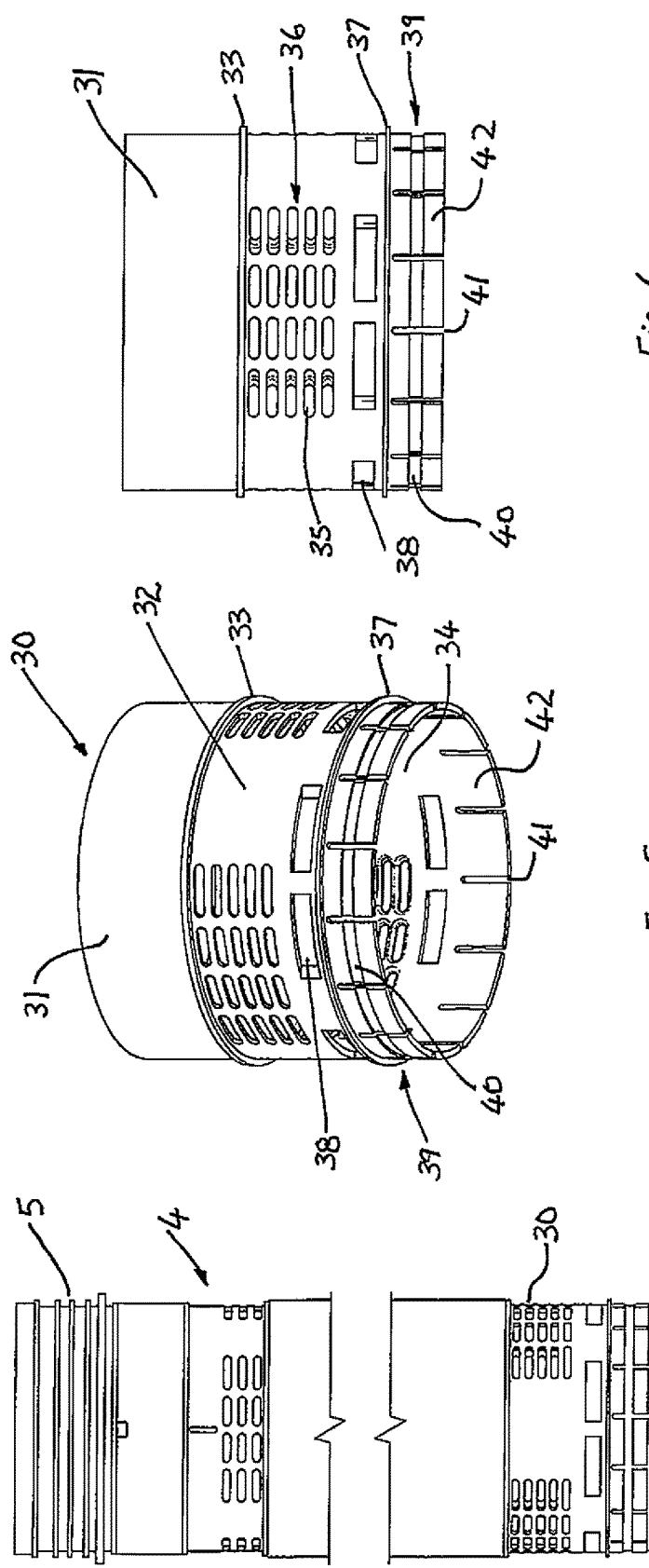

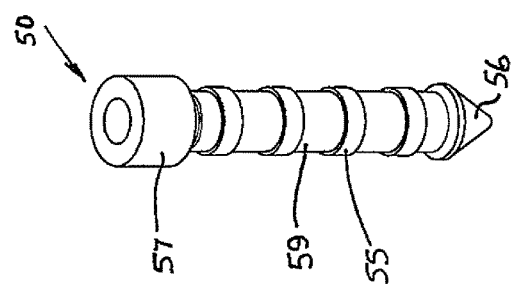
Fig. 9
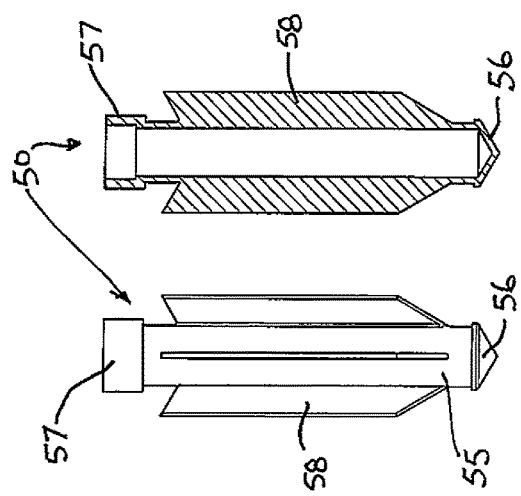
Fig. 8
Fig. 7
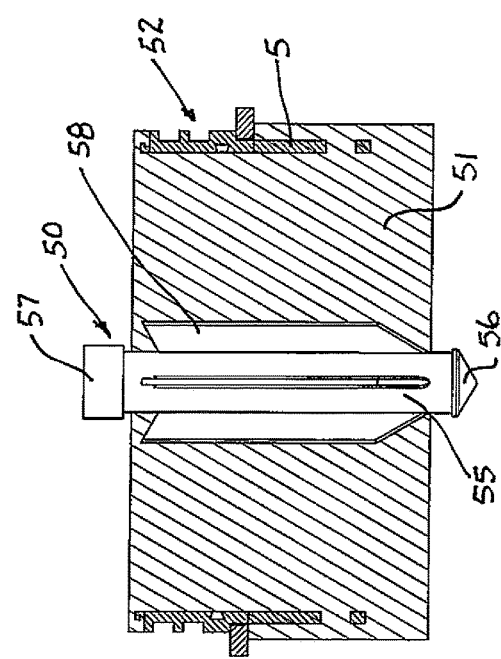
Fig. 10B

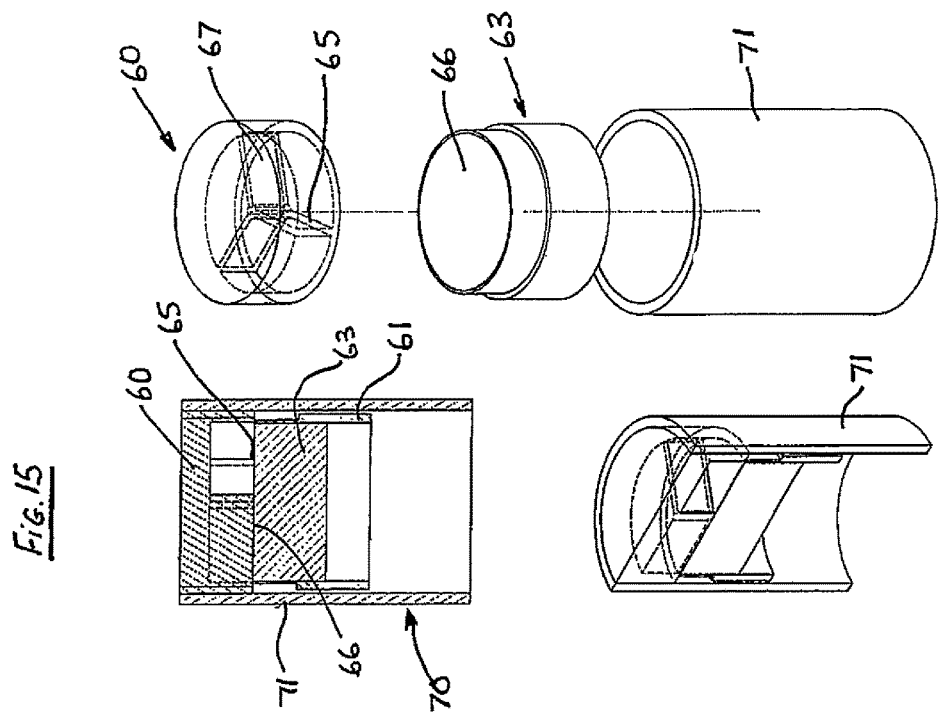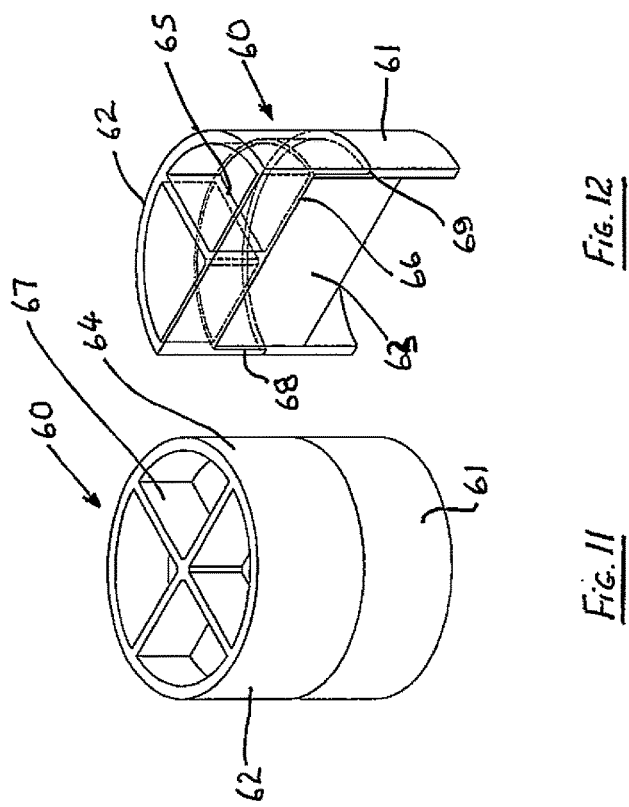

MEMBRANE POTTING METHODS

RELATED APPLICATIONS

Foreign priority benefits are claimed under 35 U.S.C. § 119(a)-(d) or 35 U.S.C. § 365(b) of Australian provisional application number 2012904203, filed Sep. 26, 2012, which is incorporated by reference herein in its entirety.

BACKGROUND

1. Technical Field

Aspects and embodiments disclosed herein relate generally to methods and apparatus for mounting porous hollow filtration membranes in a membrane filtration system.

2. Discussion of Related Art

Any discussion of the prior art throughout the specification should in no way be considered as an admission that such prior art is widely known or forms part of common general knowledge in the field.

Synthetic polymeric membranes are well known in the field of ultrafiltration and microfiltration for a variety of implementations, including desalination, gas separation, filtration, and dialysis. The properties of the membranes vary depending on the morphology of the membranes, for example, depending on parameters such as symmetry, pore shape, and pore size, and the chemical nature of the polymeric material used to form the membrane.

A large membrane surface area may be provided when a large filtrate flow is desired. In commercial embodiments, a large number of hollow porous membranes may be mounted together and housed in filtration modules. A commonly used technique to reduce the size of the filtration apparatus is to form the hollow porous membranes in the shape of hollow porous fibers. The hollow porous membranes act in parallel to filter a feed liquid, for example, water for purification. By producing a pressure differential across the membrane walls, the liquid is forced to flow through the pores of the walls of each of the hollow porous membranes while contaminants remain trapped on one side of the membranes and filtrate is withdrawn from the other side. In systems where feed liquid is applied to the outer walls of the membranes (outside-in filtration), the filtrate collects inside the hollow regions, cavities or channels (known as lumens) within the porous hollow membranes and is drawn off through ends of the lumens.

By sealing the ends of a porous hollow membrane in a module pot an impenetrable barrier may be formed between the feed and the filtrate. It is desirable that the seal formed by the barrier between the feed and filtrate be maintained to avoid contamination of the filtrate with feed. It is thus desirable that such module pots be designed to withstand forces such as hydraulic pressure from fluid flow inside the filtration module which might otherwise compromise the seal between the feed and the filtrate.

In addition to sealing the ends of porous hollow membranes, a module pot may be designed to perform further functions including structurally supporting and mounting the membranes within a module or otherwise within a filtration system. In some filtration arrangements, filtrate is withdrawn only from one end of the membranes and the other ends are merely sealed and supported by a potting head. In other arrangements, only one potting head is provided with the membranes being looped with both open ends located in the same potting head.

In some potting arrangements, the porous membrane ends may be sealingly potted using a curable resin material with the porous membrane ends being positioned within the resin material in its liquid non-cured state. The resin material may be allowed to cure to form a generally solid potting head. The curable resin material may be surrounded by a potting sleeve. The potting sleeve may be used to provide an interface between the potting head formed by the cured resin material and associated equipment such as headers and mounting apparatus.

SUMMARY

It has been found that some curable potting materials which may be used to secure filtration membranes within a potting head disposed in a potting sleeve may shrink during the curing process. This shrinkage may result in the formation of residual tensile stress within the potting head due to resistance of the potting sleeve to such shrinkage. Residual tensile stress in potting materials has been found to not only decrease fracture strength and toughness but also to reduce the fatigue life of the materials. The residual tensile stress may cause cracking, splitting, and/or breaking of the potting head. This can result in compromising the separation between the feed liquid and the filtrate stream in a filtration system and possible undesirable contamination of filtrate.

It would be desirable to provide an arrangement of a potting head and potting sleeve in which the formation of residual stress within the potting head during curing of the potting material is reduced as compared to prior known methods.

According to one aspect, there is provided a potting sleeve for use in forming a potting head having a porous hollow membrane mounted therein. The potting sleeve includes a first fixed portion and a second portion which is movable relative to the first fixed portion to reduce a peripheral extent of the second portion.

In some embodiments, the second portion of the potting sleeve is inwardly deformable to reduce the peripheral extent thereof. The second portion of the potting sleeve may include structurally weakened regions configured to provide for the second portion of the potting sleeve to be inwardly deformable. The second portion of the potting sleeve may be formed of a flexible material.

In some embodiments, the potting sleeve includes one or more openings in a wall of the potting sleeve. The openings may be slots.

In accordance with another aspect, there is provided a method of mounting a porous hollow membrane in a potting head of a membrane filtration apparatus. The method comprises providing a mold for receiving potting material and positioning a potting sleeve within the mold. The potting sleeve includes a first fixed portion and a second portion which is movable relative to the first fixed portion to reduce a peripheral extent of the second portion. The method further comprises positioning a portion of the porous hollow membrane to be mounted in a region of the mold encompassed by the potting sleeve, introducing a curable potting material into the region to immerse the portion of the porous hollow membrane in the potting material, at least partially curing the potting material to form the potting head, and removing the potting head and the potting sleeve from the mold.

In some embodiments, the second portion of the potting sleeve is inwardly deformable to reduce the peripheral extent thereof. The second portion of the potting sleeve may include structurally weakened regions configured to provide for the second portion of the potting sleeve to be inwardly deformable. The second portion of the potting sleeve may be formed of a flexible material.

In some embodiments, the potting sleeve is provided with one or more openings in a wall of the potting sleeve. The openings may be slots.

In accordance with another aspect, there is provided a method of mounting a porous hollow membrane in a support structure of a membrane filtration apparatus. The method comprises providing a mold for receiving potting material, positioning one or more deformable members within the mold, positioning a portion of the porous hollow membrane to be mounted within the mold, introducing a curable potting material into the mold to immerse the portion of the porous hollow membrane and at least part of the one or more deformable members in the potting material, at least partially curing the potting material to form the potting head, and removing the potting head and the one or more deformable members from the mold.

In some embodiments, the deformable member comprises a cylindrical plug. The plug may be hollow and collapsible. The plug may be expandable.

In some embodiments, the deformable member is formed of a flexible material. The deformable member may be formed of a material selected from the group consisting of a soft resin material and rubber.

In some embodiments, an outer surface of the deformable member is provided with engagement formations. The engagement formations may comprise one or more of a groove, a rib, a shoulder, and a fin. The engagement formations may extend axially from a central body of the deformable member. The engagement formations may extend circumferentially from a central body of the deformable member.

In accordance with another aspect, there is provided a structural element for supporting a potting head having a porous hollow membrane mounted therein and extending from a first surface of the potting head. The structural element comprises a cap configured to engage with a potting sleeve of the potting head, the cap having a bearing surface which supports a second surface of the potting head opposite to the first surface of the potting head when the cap is engaged with the potting sleeve.

In some embodiments, the cap is generally cylindrical and the bearing surface includes one or more radially extending ribs. The structural element may extend into the second surface of the potting head.

In accordance with another aspect, there is provided a potting sleeve for use in forming a potting head having a porous hollow membrane mounted therein. The potting sleeve includes at least one reinforcement member positioned between inner walls of the potting sleeve, the reinforcement member having opposed sides extending axially of the potting sleeve between a first end portion and an opposed second end portion of the reinforcement member. The reinforcement member is connected to an internal wall of the potting sleeve at connection points on each of the opposed sides of the first end portion and the reinforcement member is free of engagement with the potting sleeve apart from at the connection points.

In some embodiments, the reinforcement member is plate-like. The reinforcement member may be located along a diameter of the potting sleeve.

In some embodiments, the first end portion of the reinforcement member is spaced axially from one end of the potting sleeve.

In some embodiments, the reinforcement member, apart from adjacent the connection points is, in use, positioned within the potting head.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is an elevational view of a top potting sleeve for a membrane sub-module;

FIG. 2 is a plan view of the potting sleeve of FIG. 1;

FIG. 3A is an elevational section view of the potting sleeve of FIG. 1 taken along section B-B of FIG. 2;

FIG. 4 is a broken elevational view of a membrane sub-module according to another embodiment;

FIG. 5 is an underside perspective view of the lower potting sleeve of the sub-module of FIG. 4;

FIG. 6 is an elevational view of the lower potting sleeve of the sub-module of FIG. 4;

FIG. 7 is an elevational view of a deformable member according to another embodiment;

FIG. 8 is a cross-sectional elevational view of the deformable member of FIG. 7;

FIG. 9 is a top perspective view of a deformable member according to another embodiment;

FIG. 10B is a similar view as FIG. 10A of the deformable member of FIG. 7 positioned in use in a potting head;

FIG. 11 is a top perspective view of a potting sleeve with structural extension according to another embodiment;

FIG. 12 is a top perspective cross sectional view taken along a diameter of the potting sleeve of FIG. 11;

FIG. 13 is an exploded top perspective view of an upper portion of a membrane sub-module employing the potting sleeve according to the embodiment of FIGS. 11 and 12;

FIG. 14 is a top perspective cross sectional view taken along a diameter of the membrane sub-module of FIG. 13 in assembled form;

FIG. 15 is a cross sectional elevational view of the sub-module of FIG. 14;

DETAILED DESCRIPTION

Figure 3B:
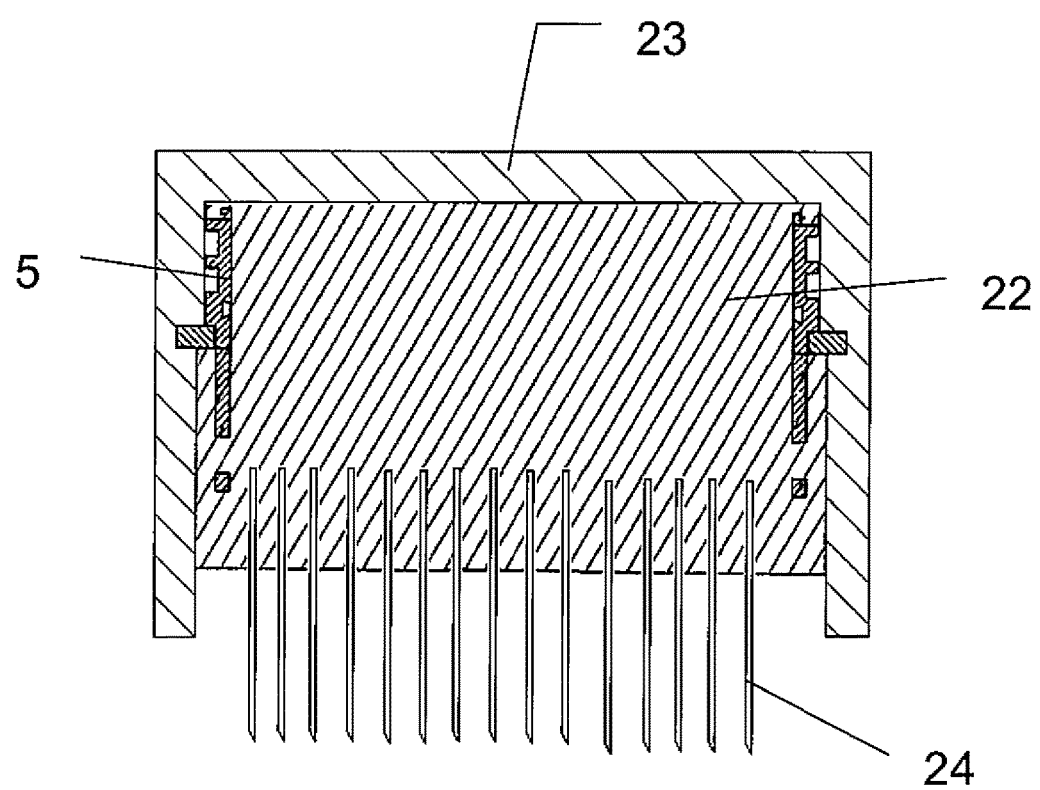
FIG. 3B is a similar side elevational sectional view as FIG. 3A with the potting sleeve positioned in a potting mold.

Aspects and embodiments disclosed herein are not limited to the details of construction and the arrangement of components set forth in the following description or illustrated in the drawings. Aspects disclosed herein are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein are directed to filtration modules or sub-modules and to methods of forming same. Aspects and embodiments disclosed herein provide for a reduced amount of residual stress in potting material of the potting heads of the filtration modules or sub-modules after formation of the potting heads as compared to prior known methods and apparatus. This reduction in residual stress may reduce the chances of mechanical failure of the potting head, for example, delamination of membranes from the potting material in which they are retained, delamination of the potting material from a potting sleeve in which it may be disposed, cracking of the potting material, or other forms of mechanical failure. Aspects and embodiments disclosed herein also provide for a membrane module to include a potting head having a potting material layer thickness with a strength greater than prior known potting heads having potting material layers of equivalent thicknesses.

In some embodiments, a potting sleeve for use in forming a filtration membrane module may be provided with one or more features to at least partially alleviate mechanical stresses which may develop within a potting material during curing of the potting material in the potting sleeve. Many potting materials shrink upon curing, resulting in tensile stresses forming in the potting material if the potting material is constrained to maintain set dimensions during curing. In some embodiments disclosed herein a potting sleeve into which a potting material may be introduced and then cured includes one or more features which provide for one or more dimensions of one or more portions of the potting sleeve to decrease during the curing of the potting material. The decrease in the one or more dimensions of the potting sleeve dining curing of the potting material accommodates at least some of the shrinkage of the potting material thus reducing the tendency for tensile stresses to develop in the curing potting material.

In other embodiments one or more stress relieving features may be disposed in the curing potting material in a potting sleeve. The one or more features may expand or be displaced during the curing of the potting material, relieving mechanical stresses which might otherwise develop in the curing potting material.

Referring to FIGS. 1 to 3 there is shown one embodiment of an upper or top potting sleeve for a membrane sub-module 4. The potting sleeve 5 is generally cylindrical though it will be appreciated that the cross-sectional shape of the potting sleeve is not critical and many suitable cross-sectional shapes may be used depending on the desired geometric shape of the potting head. For example, in various embodiments, the potting sleeve 5 may have an elliptical, square, rectangular, or triangular cross-section.

The outer surface 6 of the potting sleeve 5 may be provided with a number of engagement formations. The engagement formations may comprise, for example, circumferentially extending grooves, shoulders, or ribs on outer surface 6 of the potting sleeve 5. It will be appreciated by those in the art that, depending on specific implementations, a variety of different forms and shapes of formation may be used to provide for engagement of the potting sleeve 5 and its associated potting head with other components of the membrane sub-module 4.

A lower portion of the potting sleeve 5 is provided with a circumferential, outwardly extending rib 7 which, in use, is supported on a shoulder provided in the housing of the sub-module (not shown). Above the rib 7, two axially spaced rows of circumferentially spaced through-openings 8 and 9 are provided in the wall of the potting sleeve 5. The openings 8, 9 are shown are circular holes but it will be appreciated the shape and size of the openings is not critical and, in embodiments where openings are desired, any suitable form of opening may be used. For example, the openings 8, 9 may be in the form of circular holes, oval holes, slits, slots, or other shapes.

Above the openings 8, 9, a pair of circumferential, outwardly extending ribs 10 and 11 form a groove 12 which, in use, accommodates a sealing O-ring (not shown). A further circumferential, outwardly extending rib 13 is provided above and vertically spaced from the ribs 10 and 11 to define a supporting shoulder 13'. In some embodiments, it may be desirable to provide ribs 10, 11, and 13 in a region of the potting sleeve 5 which is substantially rigid to ensure the integrity of any mounting or sealing arrangements or structures.

An upwardly extending skirt portion 14 is provided above the rib 13. The skirt portion 14 includes a circumferential groove 15 in its base portion 16 and a reduced diameter inset upper portion 17 with a further circumferential groove 18 positioned between the base portion 15 the upper extent of the inset portion 17. This groove 18 serves to form an outwardly extending lip 19 at the upper extent of the inset portion 17. The lip 19 may be used to engage with a lifting mechanism (not shown) to remove the sub-module from the filtration apparatus.

The skirt portion 14 forms a portion of the potting sleeve 5 which it movable relative to the fixed lower portion of the sleeve. The skirt portion 14 may be utilized to reduce the peripheral extent of the movable portion of the potting sleeve 5. The skirt portion 14 may include a plurality of circumferentially spaced, vertically extending slots 20 formed therein to define deformable or flexible finger portions 21 therebetween.

As best shown in FIGS. 3A and 3B, in use, the upper potting sleeve 5 is positioned in a potting mold 23, together with the membranes 24 to be potted, and is filled with potting material 22 from a level just below the upper set of through-openings 9 to above the upper extent of the potting sleeve 5. The potting material 22 may include any material which may retain filtration membranes 24 within the potting sleeve 5. The potting material 22 may include, for example, urethane, resin, epoxy, or other suitable materials. In some embodiments, the membrane pot may be formed from more than a single layer of potting material, for example, as disclosed in co-pending U.S. patent application Ser. No. 13/087,548, which is incorporated herein by reference in its entirety for all purposes. When more than one layer of potting material is used the layers may be formed of different materials. For example a lower layer distal from the side of the potting head from which the membranes 24 emerge may be formed of a material which strongly adheres to the membranes 24 but is relatively rigid, for example, an epoxy material. A softer potting material, for example, a urethane material may form a layer above the rigid layer. The membranes 24 may emerge from the softer potting material. The softer potting material may flex in use providing for the membranes 24 to move slightly at the point they enter the softer potting material, which may decrease the chances for the membranes 24 to shear from the potting head.

In some embodiments, the inner surface of the potting sleeve 5 may include one or more layers of material which may promote adhesion of the potting material 22 to the potting sleeve, and/or which may elastically deform to facilitate the reduction in mechanical stresses in the cured potting material 22. The one or more layers of material may include, for example, a layer of a urethane material.

As the potting material 22 cures and contracts, the wall of the portion of the potting sleeve 5 defined by the flexible finger portions 21 may deform radially inward to reduce the peripheral extent of skirt portion 14 of the potting sleeve 5 and reduce or eliminate mechanical stresses which might otherwise form within the cured potting material.

It will be appreciated that although slots 20 may be utilized in some embodiments to weaken the skirt portion 14 and provide a movable portion of the potting sleeve 5 to reduce the peripheral extent thereof by inward deformation of the sleeve wall, a variety of other configurations may be used to achieve a similar result in providing for deformability of the potting sleeve. The slots 20 may be replaced by or augmented with thin flexible regions which enable the finger portions 21 to flex inwardly. Further, in some embodiments, the potting sleeve 5 or a portion of the potting sleeve may be formed from a deformable or flexible material. The flexible material may be any material which may adhere to potting material 22 which may be used to retain filtration membranes within the potting sleeve 5 and which has sufficient flexibility to contract along with the potting material 22 upon curing. The flexible material may include, for example, urethane or rubber. In some embodiments, the flexible material may be urethane including a flexibilizing agent.

In another embodiment, the wall of the potting sleeve or a portion thereof may be formed of a number of radial segments which move circumferentially relative to one another to produce an inwardly collapsible configuration. Further, although the slots 20 are shown as extending generally vertically, it will be appreciated that they may extend at an angle to vertical, if desired. For example, the slots may extend horizontally, breaking the skirt 14 into a plurality of horizontal finger-like segments or may form a spiral in the skirt 14.

Referring to FIGS. 4 to 6, there is shown an embodiment of a lower potting sleeve 30. The lower potting sleeve 30 is generally similar in configuration to the upper potting sleeve 5 described above and may include any one or more of the features of the upper potting sleeve 5.

FIG. 4 shows a broken perspective view of a membrane sub-module 4 with an upper potting sleeve 5 and a lower potting sleeve 30.

As shown in FIGS. 5 and 6, the lower potting sleeve 30 has a smooth-walled fixed upper portion 31 divided from a fixed middle portion 32 by a circumferential outwardly extending or protruding locating shoulder 33. In a similar manner to the upper potting sleeve 5, the middle portion 32 of the lower potting sleeve wall 34 is provided with a series of vertically spaced rows of through-openings 35. The through-openings 35 in each row are circumferentially spaced from one another and formed in circumferentially spaced groups 36 consisting of a number of rows of through-openings 35. The through-openings 35 are illustrated as are rounded slots, however, it will be appreciated the form, shape, size, and number of the through-openings 35 is not critical and any suitable form or number of through-openings 35 may be employed. In use, these openings 35 provide for fluid communication with the membranes mounted in the potting head.

The lower extent of the middle portion 32 of the sleeve 30 is defined by a further circumferential, outwardly extending locating shoulder 37. Adjacent and above the locating shoulder 37, a further row of circumferentially spaced slot openings 38 are provided in the sleeve wall. It will be appreciated the form, shape, size, and number of the openings 38 is not critical and any suitable form or number of openings 38 may be employed.

A lower skirt 39 extends downwardly below the shoulder 37 and has a circumferential groove 40 formed therein. In a similar manner to the skirt 14 of the upper potting sleeve 5, the lower skirt 39 is movable relative to the fixed upper portion 31 and the fixed middle portion 32 of the lower porting sleeve 30. The lower skirt 39 includes a plurality of circumferentially spaced, vertically extending slots 41 formed therein to define deformable or flexible finger portions 42 therebetween. The lower skirt 39 thus forms a movable portion of the potting sleeve to reduce the peripheral extent thereof by deformation of the flexible finger portions 42. As potting material disposed within the potting sleeve 30 cures and contracts, the wall 34 of the lower potting sleeve 30 defined by the flexible finger portions 42 can move radially inward to reduce the peripheral extent of skirt 39 of the potting sleeve 30 to reduce or eliminated stresses which might otherwise be formed within the cured potting head.

Although the embodiments described above include openings in the potting sleeves and a variety of engagement formations formed in the outer surfaces of the potting sleeves, it will be appreciated these features are not critical and embodiments comprising a simple plain potting sleeve without openings or particular engagement formations could be employed provided the potting sleeve includes a movable portion which enables the peripheral extent of the potting sleeve to be reduced when the potting material shrinks during curing, thus reducing the potential for mechanical stresses to develop within the potting material.

Referring to FIGS. 7 to 10B, another embodiment of a potting head 52 is illustrated. In this embodiment a deformable member 50 is positioned in the potting material 51 during the potting process so as to relieve stresses produced during the curing of the potting material 51.

Figure 10A:
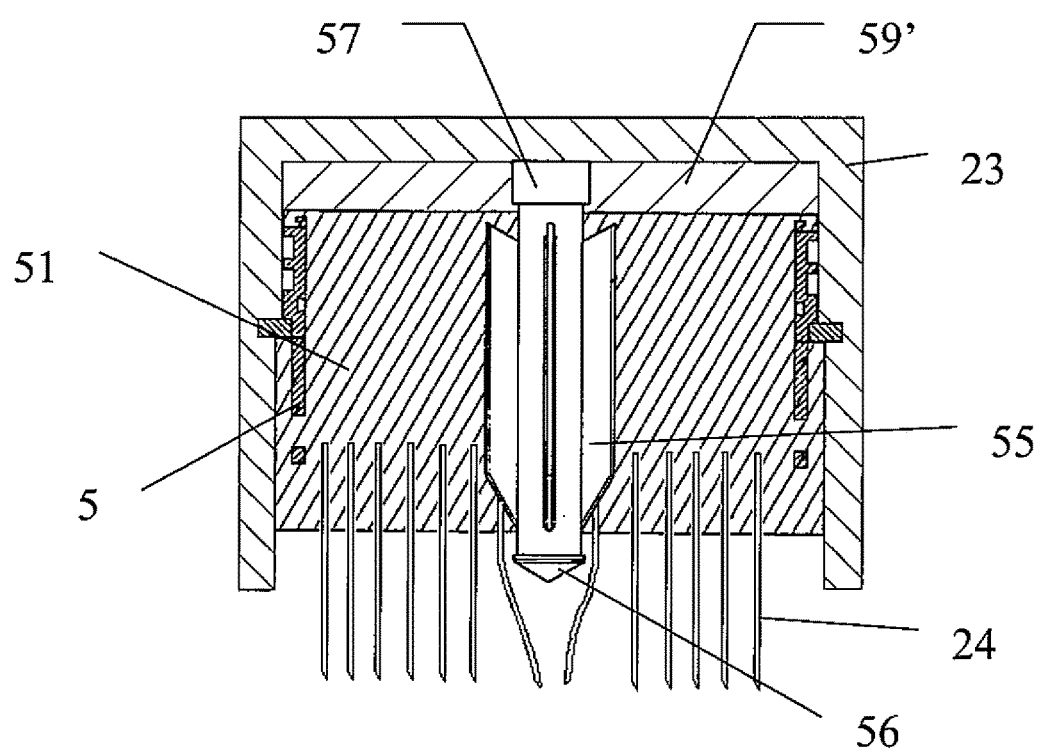
FIG. 10A is a cross-sectional elevational view of a potting mold with the deformable member of FIG. 7 positioned in use in the potting material together with filtration membranes.

As will be appreciated, a variety of different forms of deformable member 50 may be used to achieve the desired function. Embodiments disclosed herein are not limited to the type of deformable member 50 illustrated in FIGS. 7 to 10B. Further, although a single deformable member 50 is shown in FIGS. 10A and 10B, it will be appreciated that a number of deformable members 50 may be positioned as desired throughout the potting head 52.

One embodiment of a suitable deformable member 50 is shown in FIGS. 7 and 8. The deformable member 50 comprises a generally cylindrical, hollow, elongate plug 55. One end of the plug 55 is formed with a conical head 56 while the other end is formed with an enlarged diameter base portion 57. The outer wall of the elongate plug 55 is provided with outwardly extending engagement formations for providing engagement with the potting material of the potting head. The engagement formations may comprise longitudinally extending fins 58 spaced at 90° intervals around the circumference of the plug 55. It will be appreciated that more or fewer than four longitudinally extending fins 58 may be utilized and that these fins 58 need not be spaced at 90° intervals but may be spaced at any particular angular interval or intervals desired. Further, in some embodiments, the fins 58 need not extend along the lateral extent of the deformable member 50 as illustrated, but may alternatively or additionally be in the form of rings or tabs extending from a central body of the deformable member with surfaces arranged normal to the lateral extent of the central body of the deformable member 50 or at other angles as desired. It will be appreciated that any suitable form of engagement formation may be used, for example, grooves, ribs, shoulders, dimples, or formations of other shapes.

The embodiment shown in FIG. 9 illustrates another form of the engagement formations. In this embodiment the outer wall or surface of the plug is provided with a series of axially spaced circumferential grooves 59. It will be appreciated that in other embodiments, the deformable member 55 may assume even additional shapes. For example, the central body of the deformable member 55 need not by cylindrical as illustrated, but may rather be formed with a square, rectangular, oval, or polygonal cross section, or any other cross section as desired. Further, the cross-sectional area of the central body of the deformable member 55 may vary along its lateral extent, for example, expanding or decreasing from a base to a tip of the deformable member 55.

The plug 55 may be hollow and may be made of thin molded plastic material. In use, the thin plastic material may deform due the heat released by the exothermic reaction which occurs during curing of the potting material 52. In other embodiments, the deformable plug may be formed of pre-molded rubber which can readily adhere to the potting material.

In another embodiment, the deformable plug 55 can be molded from a soft resin material, for example, urethane a short time (for example, about 30 minutes) before pre-potting of the membranes. The soft urethane plug can then be located in the potting material to ensure chemical bonding between the plug and the potting material of the potting head. The soft resin material provides a readily deformable plug.

The deformable plug 55 may be molded in a mold coated with polytetrafluoroethylene or another non-stick material to ensure the outer surface of the plug is free of mold release agent which could hinder the chemical bond between the plug 55 and the potting material of the potting head.

FIGS. 10A and 10B show one embodiment of the deformable plug 55 located within a potting head 52. In use, the plug 55 is attached by means of the enlarged base portion 57 to a pre-potting dish 59'. The plug 55 is then located within the potting mold 23 together with the membranes 24 to be potted, the potting sleeve 5 and potting material 51 introduced into the potting mold 23. The conical head 56 of the plug 55 assists deflection of the membranes 24 away from the plug 55 during the insertion of the membranes 24 into the potting mold 23. The mold 23 may be centrifuged to facilitate correct distribution of the potting material 51 around the membranes 24. Following curing of the potting material 51, the base 57 of the plug may be sliced off leaving the plug 55 flush with the top of the potting head 52.

The soft core or cores created within the potting head 52 by the deformable plug 55 will stretch or otherwise deform allowing the potting material 51 to shrink as it cures, avoiding much of the residual stress which might otherwise be produced by the shrinkage. The reduction in residual stresses within the potting head 52 may lead to a reduction in stress at the membrane-potting material interface.

FIGS. 11 to 14 show a further embodiment of a potting head arrangement including a mechanism for mechanically reinforcing the potting head. In some prior methods as the size of a potting head increases, the thickness of the potting head is increased to resist fluctuating pressures within the membrane sub-module during use. The increased thickness of the potting head results in excessive usage of potting material and the consequent increase in weight of the sub-module. Further, the increased thickness of the potting head may result in an undesirable lumen pressure drop in the length of the membrane as the length of the membrane operating at maximum flow may be substantially increased. Accordingly, where possible, it is desirable to minimize the thickness of the potting head while maintaining its mechanical strength.

It has been recognized that increasing the size of a potting head may increase the desirability of providing a structure to reinforce the potting head to reduce deflection of the potting material and prevent breakage and cracking of the potting material or potting head during use. Incorporating reinforcing elements such as ribs within the potting head, however, may result in a pot structure which is rigid and stiff and which may resist the shrinkage of potting material during curing, thus providing for the formation of residual mechanical stresses in the cured potting material. It has been found that where there is no connection between the reinforcing elements and the potting sleeve surrounding the potting material, a large shear stress may be produced between the internal walls of the potting sleeve and the potting material during curing. Alternatively, where no reinforcing elements are provided, deflection of the potting head and/or potting material during use when exposed to high pressures in a filtration system may be undesirably large. It has been found desirable to provide reinforcement of the potting material without producing excessive stress between the potting material and the potting sleeve during curing. Further, by providing a supporting structural element, the mechanical integrity of the potting head can be maintained while providing a potting material layer which is more resistant to deformation than a potting material layer of an equivalent thickness which is not reinforced with a supporting structural element.

FIGS. 11 and 12 show perspective views of an extension fitting 60 for a potting sleeve 61. The extension fitting 60 includes structural element 62 for supporting a potting head 63 having one or more porous hollow membranes (not shown) mounted therein and extending from a first surface thereof. The structural element 62 comprises a cap 64 configured to engage with a potting sleeve 61 of the potting head 63. The cap 64 has a bearing surface 65 which supports a second surface 66 of the potting head 63 opposite the first surface of the potting head 63 which forms an interface with the porous hollow membranes disposed in the potting head 63 when the cap 64 is engaged with the potting sleeve 61. The bearing surface 65 may comprise the lower surfaces of a series of radially extending ribs 67 which are equally spaced around the circumference of an inner wall of the generally cylindrical cap 64. The ribs 67 extend diametrically of the cylindrical cap 64. The cylindrical cap 64 has a downwardly extending skirt portion 68 below the lower surface 65 of each rib 67 and engages with a reduced diameter stepped portion 69 of the potting sleeve 61. It will be appreciated that other forms of ribs 67 may additionally or alternatively be included in the cap 64. For example, the ribs 67 may include one or more rings which may be disposed concentrically within the cap, and/or may include ribs which are non-equally spaced around the circumference of the inner wall of the cap 64.

FIGS. 13 and 14 show the use of the extension fitting in a membrane module 70. In this embodiment, the potting sleeve 61 and cap 64 slide into a generally cylindrical module housing 71, although it will be appreciated that the module housing 71, potting sleeve 61, and cap 64 may in other embodiments have alternative cross sections, for example, square or rectangular cross sections. The module cap 64 is removably engaged with the top of the module housing 71 and applies an axial support force to the surface 66 of the potting head 63 to prevent deflection thereof under fluctuating pressure from within the sub-module during use.

It will be appreciated that although a bearing surface comprising the lower surfaces of the series of radially extending ribs 67 is shown in FIGS. 11 to 14 a variety of forms of bearing surface could alternatively or additionally be used. For example, a cylinder having a generally flat bearing surface corresponding to the upper surface of the potting head could also or alternatively be used.

Figure 18:
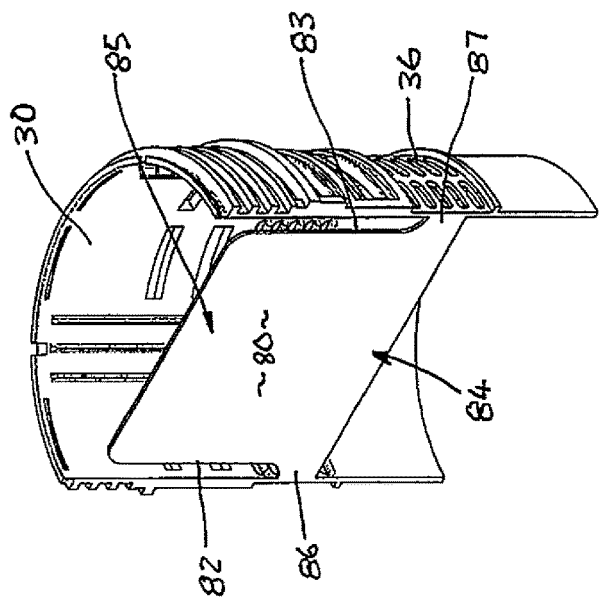
FIG. 18 is a top perspective cross sectional view taken along a diameter of the potting sleeve of FIG. 16 without potting resin in the sleeve.
Figure 17:
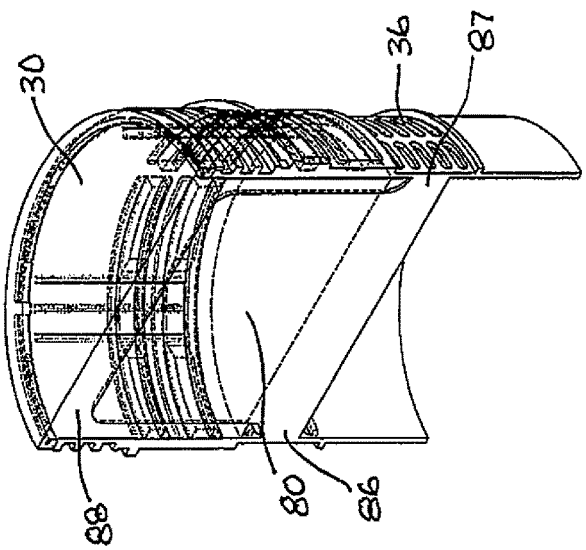
FIG. 17 is a top perspective cross sectional view taken along a diameter of the potting sleeve of FIG. 16 with potting resin in the potting sleeve.
Figure 16:
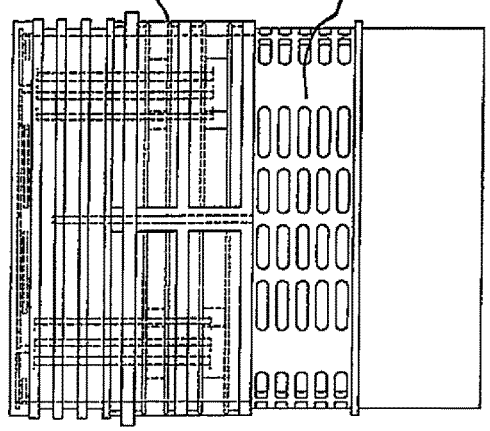
FIG. 16 is an elevational view of an upper potting sleeve according to another embodiment.

FIGS. 16 to 18 show another embodiment of a potting sleeve. The overall configuration of the potting sleeve is similar in configuration to the sleeve shown in FIGS. 5 and 6. Designations are the same for the same features in each embodiment.

The potting sleeve 30 includes at least one reinforcement member 80 positioned between inner walls of the potting sleeve 30. The reinforcement member 80 has opposed sides 82 and 83 extending axially of the potting sleeve 30 between a first end portion 84 and an opposed second end portion 85 of the reinforcement member 80. The reinforcement member is connected to an internal wall of the potting sleeve 30 at connection points 86, 87 on each of the respective opposed sides 82 and 83 of the first end portion 84. The reinforcement member 80 is free of engagement with the potting sleeve 30 apart from at the connection points 86, 87.

As best shown in FIG. 17 the reinforcement member 80 is generally plate-like and the connection points 86 and 87 are outwardly extending portions at the lower ends of each opposed side 82 and 83 of the reinforcement member 80. In use, the upper non-fixed portion of the reinforcement member 80 is embedded in the potting head material 88. The non-fixing of this portion enables the reinforcement member 80 to move during curing and shrinking of the potting material 88 and thus undue stresses between the potting head material 88 and the inner surface of the potting sleeve 30 are reduced or avoided. It will be appreciated that a similar form of potting sleeve could be employed for the upper potting sleeve of the membrane sub-module. The form, shape and dimensions of the reinforcement member 80 are not critical. For example, the reinforcement member 80 may in alternate embodiments include more than one plate-like member which may be parallel or which may intersect the plate-like member illustrated. The reinforcement member 80 may be in a shape other than the generally rectangular shape illustrated, for example a semi-circular shape. In some embodiments, one or more apertures may be defined in the reinforcement member 80. Further, it will be appreciated that one of more reinforcement members having the desired operational attributes could be used. The reinforcement members may interengage or intersect one another provided they have a portion or portions free to move relative to the potting material 88.

Having thus described several aspects of at least one embodiment, it is to be appreciated various alterations, modifications, and improvements will readily occur to those skilled in the art. For example, it is to be appreciated that any of the features of any of the embodiments disclosed herein may be combined or substituted for features of any other embodiment disclosed herein. Such alterations, modifications, and improvements are intended to be part of this disclosure, and are intended to be within the scope of the disclosure. Accordingly, the foregoing description and drawings are by way of example only.

What is claimed is:

1. A potting sleeve for use in forming a potting head having porous hollow fiber membranes mounted therein, the potting sleeve including at least one reinforcement member positioned between inner walls of the potting sleeve, the reinforcement member located along a diameter of the potting sleeve and configured as a continuous plate-like structure having opposed sides extending axially of the potting sleeve between a first end portion and an opposed second end portion of the reinforcement member, wherein the reinforcement member is connected to an internal wall of the potting sleeve at outwardly extending connection points on corners of each of the opposed sides of the first end portion such that the opposed sides of the reinforcement member are free of engagement with the inner wall of the potting sleeve apart from at the connection points.

2. The potting sleeve of claim 1, wherein the first end portion of the reinforcement member is spaced axially from one end of the potting sleeve.

3. The potting sleeve of claim 1, wherein the reinforcement member, apart from adjacent the connection point is, in use, positioned within the potting head.

4. The potting sleeve of claim 1, further comprising one or more openings in a wall of the potting sleeve for providing fluid communication with the porous hollow fiber membranes.

* * * * *